H. A. LARSEN & A. C. ROEBUCK.
LOOP SETTER.
APPLICATION FILED FEB. 19, 1916.
1,284,371.
Patented Nov. 12, 1918.
2 SHEETS—SHEET 1.
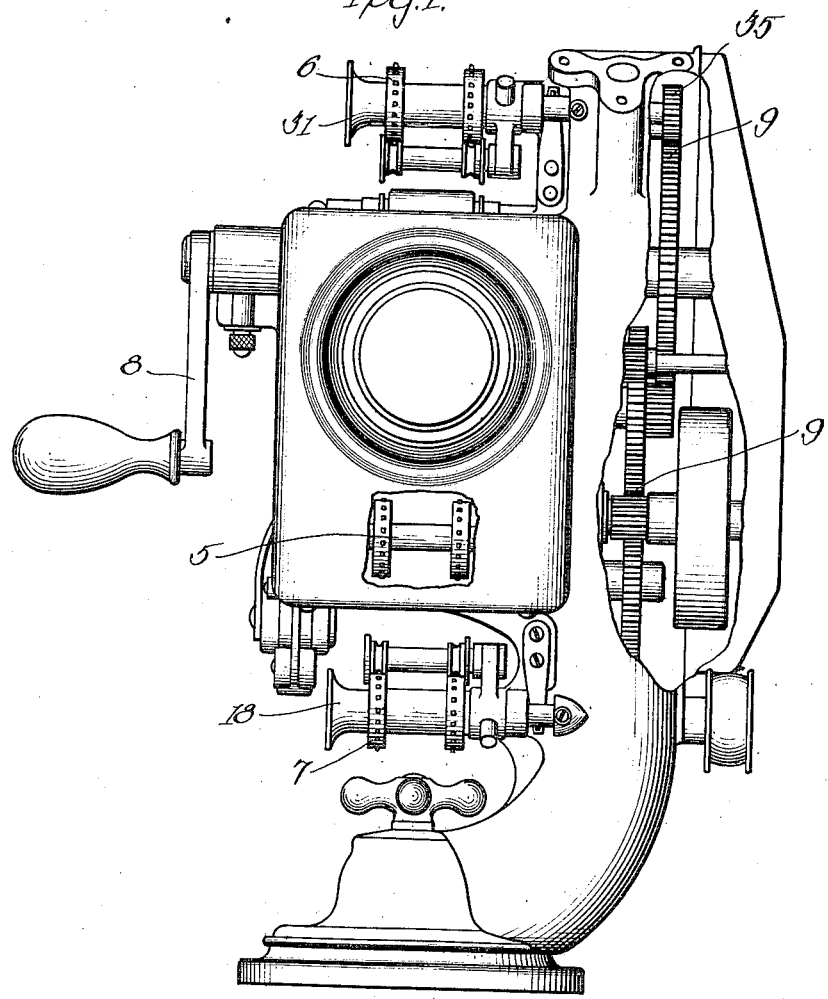
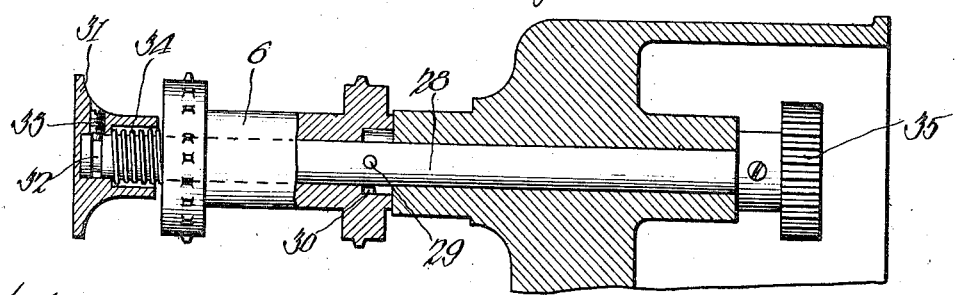

H. A. LARSEN & A. C. ROEBUCK.
LOOP SETTER.
APPLICATION FILED FEB. 19, 1916.
1,284,371.
Patented Nov. 12, 1918.
2 SHEETS—SHEET 2.
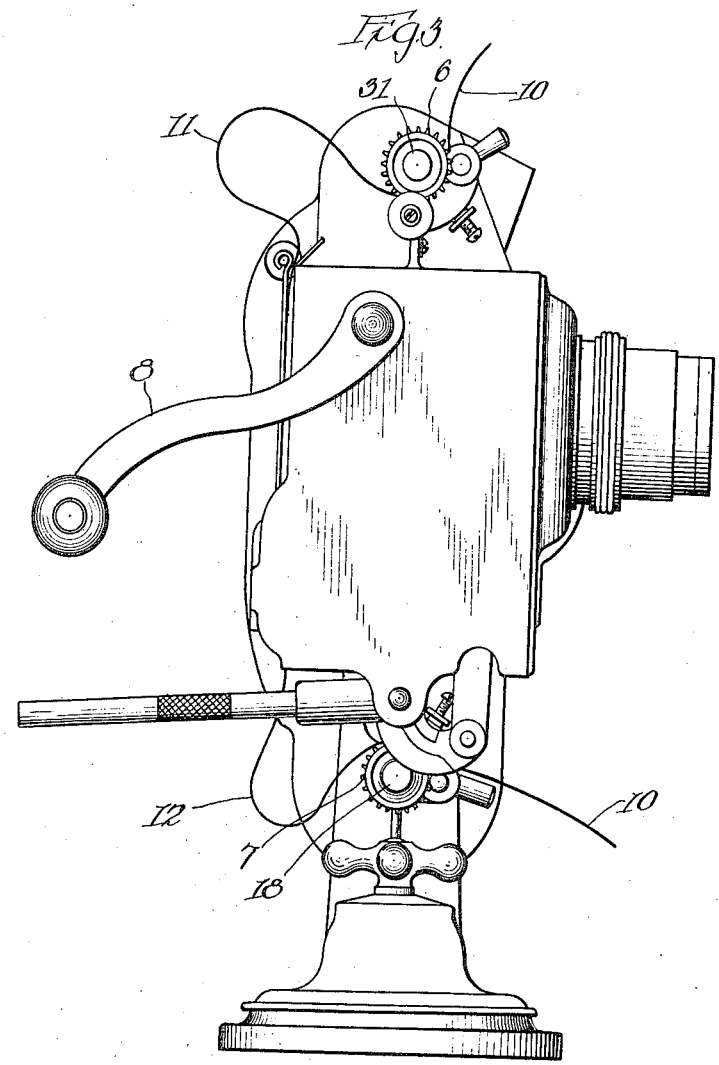
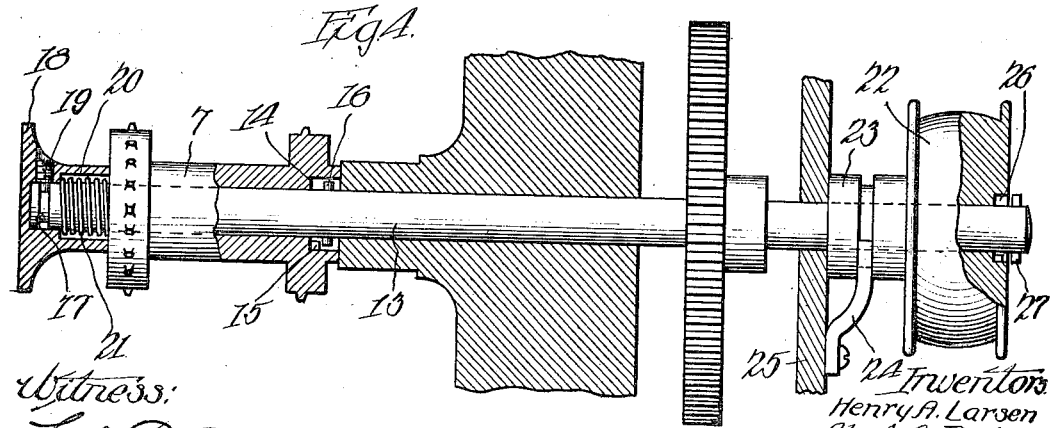

UNITED STATES PATENT OFFICE.

HENRY A. LARSEN, OF CHICAGO, AND ALVAH C. ROEBUCK, OF PARK RIDGE, ILLINOIS, ASSIGNORS TO THE ENTERPRISE OPTICAL MANUFACTURING COMPANY, OF CHICAGO, ILLINOIS, A CORPORATION OF ILLINOIS.

LOOP-SETTER.

1,284,371.   Specification of Letters Patent.   Patented Nov. 12, 1918.

Application filed February 19, 1916. Serial No. 79,263.

*To all whom it may concern:*

Be it known that we, HENRY A. LARSEN, a citizen of the United States, residing at Chicago, in the county of Cook and State of Illinois, and ALVAH C. ROEBUCK, a citizen of the United States, residing at Park Ridge, in the county of Cook and State of Illinois, have invented certain new and useful Improvements in Loop-Setters, of which the following is a specification.

This invention relates to a motion picture machine, and more particularly to that portion of the mechanism of such a machine by which the film is operated. The principal object of the invention is to provide simple and efficient means for controlling the length of the loop in the film above or below the place where it is exposed to the light. The invention consists in the novel construction, combination and arrangement of the parts by means of which the desired result is obtained.

In the drawings, Figure 1 is a front view of a motion picture machine embodying the features of the present invention, some of the parts being broken away for clearness; Fig. 2 is a view partly in section of the upper feeding sprocket and its connected parts; Fig. 3 is a side elevation of a machine to which this invention is applied, and Fig. 4 is a view partly in section of the lower feeding sprocket and its operating parts.

In many instances films are provided for motion picture machines of which the portions between the perforations have been mutilated by use to such a point that they are unreliable, and frequently because of this condition and the constant strain on the film as it is being drawn by the take-up reel over the lower feeding sprocket, or because the film has slipped on the intermittent sprocket the loop is shortened to such an extent as to be of no value as a protection for the intermittent sprocket feed. To provide for such a contingency and to replace the loop it is customary to release the lower feeding sprocket from driving connection with the shaft on which it is mounted, thus allowing this sprocket to stand without movement for a short period during which time the loop increases in length, then the connection between the shaft and the sprocket is made so that the sprocket will be driven with the shaft. Ordinarily a loop in the film is provided both above and below the intermittent sprocket, and if it is desired also to decrease the loop above the intermittent sprocket the upper feeding sprocket is released from its shaft for a short time which will cause the intermittent sprocket to take up such portion of the loop above it, which is in excess of the length desired whereupon the upper feeding sprocket may be placed in operation.

This invention may have a general application to any motion picture machine which comprises an intermittent sprocket 5 and an upper feeding sprocket 6 or a lower feeding sprocket 7, or all of them in the same machine. These feeding sprockets are all driven by a common crank 8 which directly drives the sprockets through a train of gears 9. In the motion picture art the intermittent feed sprocket is so called because of the fact that the film is moved intermittently by it so that for a part of the time the film is stopped but is fed in the remaining time, the upper and lower feeding sprockets being rotated continuously under ordinary conditions. Because of this intermittent movement of the film designated generally by the reference numeral 10 an upper loop 11 is provided above the intermittent sprocket and a lower loop 12 is formed below the intermittent sprocket. Ordinarily when the upper and lower loops have been properly made in starting the film, they will be maintained as the machine is operated but it sometimes happens, if the perforations in the film are mutilated, that the film will slip taking up any slack that there may be in the lower loop. This will cause the lower feeding sprocket to draw the film tightly from the intermittent sprocket.

In order to overcome this difficulty the lower feeding sprocket 7 is freely mounted on its shaft 13 and a recess 14 is formed at one end in which is a pin or projection 15 with which the corresponding pin or projection 16 secured to the shaft 13 is adapted to engage in the ordinary operation. At the end of the shaft 13 adjacent the sprocket is an annular groove 17, and a knob 18 fitting over the end of the shaft is rotatably secured thereto by means of a set screw 19, the extremity of which engages in the groove. This knob is formed with a recess 20 in which a spring 21 is seated, tending to separate the knob and the sprocket 7. At the other end of this shaft is a pulley 22 freely mounted on the shaft but held in place by means of a grooved collar 23 with which a bracket 24 secured to the frame 25 engages. This pulley is formed with a notch 26 and the shaft is provided with a pin 27 adapted to coöperate with the notch 26 so that when the shaft 13 is pressed longitudinally by means of the knob 18 the pin 27 is disengaged from the notch 26 of the pulley 22 and the pin 16 attached to the shaft is disengaged from the pin or projection 15 of the sprocket 7.

The upper feeding sprocket 6 is provided with a somewhat similar construction comprising a shaft 28 upon which it is freely rotatable, the shaft being provided with a pin 29 and the sprocket with a corresponding pin or projection 30 and the shaft having a knob 31 secured thereto by means of a groove 32 and a set screw 33 with a spring 34 interposed between the knob and the sprocket 6. At the other end of the shaft 28 is a driving gear 35 which comprises one gear of the train 9. It is obvious that when the shaft 28 is pressed inwardly the pin 29 of the shaft will be disengaged from its connection with the pin or projection 30 of the sprocket 6.

In the normal operation of the machine it is to be understood that the upper and lower loops once formed will be retained and the upper and lower sprockets 6 and 7 will be driven continuously. If the film slips so as to reduce the lower loop 12 it is necessary only to press inwardly on the knob 18 which will disengage the lower feeding sprocket 7 from its shaft 13 and will also disengage the pulley 22 from the driving shaft 13. This pulley is connected by means of a belt to a film take-up reel (not shown) so that the disengagement of the pulley from the shaft 13 also stops the operation of the take-up reel. It should be noted that when the knob 18 is pressed the inner edge bears against the outer end of the sprocket 7 and presses the inner end of the sprocket against the bearing support which serves to prevent the sprocket wheel from rotating. As soon as pressure on the knob 18 is released the spring 21 presses the parts into their normal operating connection.

In a similar manner if the loop 11 above the intermittent sprocket 5 becomes too large the knob or thumb-piece 31 of the shaft 28 is pressed which disengages the upper feeding sprocket 6 from the shaft without affecting the operation of the intermittent sprocket 5 which continues to take up the loop 11. As soon as the knob 21 is released the parts are pressed into their normal operating position by the spring 24.

With this construction it is obvious that the loops can be maintained and set in a very simple and efficient manner. To increase the lower loop the lower sprocket is stopped and to decrease the upper loop the upper sprocket is stopped. As soon as the actual pressure on either of the feeding sprockets is removed they immediately resume their normal operation and the loops are properly maintained even though the perforations of the film are torn or mutilated.

We claim:

1. In a motion picture machine, the combination with film feeding sprockets, of means to operate them comprising a rotatable and longitudinally movable shaft for each sprocket upon which the sprocket is loosely but directly mounted, and means for temporarily disengaging one sprocket from its shaft to prevent the operation of the sprocket and for positively stopping the sprocket.

2. In a motion picture machine having film feeding sprockets, the combination of driving means therefor comprising rotatable shafts upon which the sprockets are directly and loosely mounted, each of said shafts being longitudinally movable without disengagement from the driving means, and means for engaging the sprocket to actually stop it, a separable spring-pressed connection between each sprocket and its shaft for temporarily rendering that sprocket inoperative.

3. In a motion picture machine, the combination with a film feeding sprocket having a recess at one end, of a rotatable and longitudinally movable driving shaft therefor having a projection adapted to coöperate with the said recess, a fixed bearing for the shaft which the sprocket normally abuts, and a spring-pressed knob in connection with the shaft, and movable to directly engage the sprocket, the spring bearing against the sprocket tending to hold the sprocket and shaft in driving engagement which may be disconnected by pressing the shaft longitudinally.

4. In a motion picture machine, the combination with a film feeding sprocket having a recess at one end, of a rotatable and longitudinally movable driving shaft upon which the sprocket is rotatable having a projection which corresponds with the recess of the sprocket, a bearing frame in which the shaft is rotatable which the sprocket normally abuts, the shaft extending through the sprocket with an annular groove at its outer end, a knob formed with a recess at the said end adjacent the sprocket, means for loosely connecting the knob with the groove of the shaft, and a spring interposed in the recess of the knob tending to press the sprocket against the said bearing and to hold the sprocket and shaft in driving connection, the shaft and sprocket being disconnected and the knob bearing against the outer end of the sprocket pressing the sprocket against the bearing to stop the sprocket when the sprocket and shaft are disconnected.

5. In a motion picture machine, the combination with a film feeding sprocket, of a rotatable and longitudinally movable shaft upon which the sprocket is freely rotatable, a film reel driving pulley also mounted on the shaft, a frame in which the shaft is mounted, means for fixing the movement of the pulley with respect to the frame, a separable connection between the shaft and pulley, a separable connection between the shaft and sprocket, and a spring-pressed knob for temporarily moving the shaft longitudinally to break the said separable connections, the said connections being restored by the spring.

6. In a motion picture machine, the combination with a film feeding sprocket, of a rotatable and longitudinally movable driving shaft upon which the sprocket is loosely mounted, a separable connection between the sprocket and the shaft disengaged by the longitudinal movement of the shaft, and a freely rotatable knob at the end of the shaft which bears against the sprocket to stop it when the shaft is disengaged therefrom.

7. In a motion picture machine, the combination with a film feeding sprocket, of a rotatable and longitudinally movable shaft upon which the sprocket is loosely mounted, a fixed bearing in which the shaft is rotatable normally abutting one end of the sprocket, a separable connection between the sprocket and shaft disengaged by longitudinal movement of the shaft, and a freely rotatable knob at the end of the shaft which is pressed against the sprocket causing it to engage the fixed bearing to stop the sprocket when the shaft is disengaged therefrom by its longitudinal movement.

In testimony whereof we have signed our names to this specification, in the presence of two subscribing witnesses, on this eleventh day of February, A. D. 1916.

HENRY A. LARSEN.
ALVAH C. ROEBUCK.

Witnesses:
A. J. SULLIVAN,
W. C. ANDERSON.